United States Patent [19]

Hara

[11] 3,724,639
[45] Apr. 3, 1973

[54] APPARATUS FOR ARRANGING ARTICLES IN STAGGERED ROWS

[75] Inventor: Takao Hara, Hiratsuka, Japan

[73] Assignee: Toyo Glass Company, Limited

[22] Filed: Dec. 21, 1970

[21] Appl. No.: 100,194

[30] Foreign Application Priority Data

Dec. 19, 1969 Japan.................................44/101617

[52] U.S. Cl. .....................................198/31 R, 53/149
[51] Int. Cl. ..................................................B65g 47/26
[58] Field of Search ......198/22, 22 B, 24, 29, 30, 31, 198/31 AA, 31 AB, 31 R; 53/149, 159

[56] References Cited

UNITED STATES PATENTS

| 2,400,484 | 5/1946 | Campana | 53/159 X |
| 1,436,455 | 11/1922 | Mingle | 198/31 AA |
| 2,470,795 | 5/1949 | Socke | 53/149 X |

Primary Examiner—Evon C. Blunk
Assistant Examiner—H. S. Lane
Attorney—Robert E. Burns and Emmanuel J. Lobato

[57] ABSTRACT

Apparatus is disclosed for arranging articles which are continuously fed in a straight line condition on a feed conveyor into a staggered or zig-zag condition on a receiving conveyor while transferring the articles onto the receiving conveyor in a direction perpendicular to the advancing direction of the feed conveyor. The apparatus comprises a movable arm reciprocating in the direction of movement of the receiving conveyor, a sliding frame slidable in a direction perpendicular to the movement of the arm and having a feeding plate for pushing the articles from the feed conveyor onto the receiving conveyor, and means for driving the sliding frame to slide it with respect to the movement of the movable arm so that it cyclically feeds a predetermined number of articles from the feed conveyor onto the receiving conveyor.

7 Claims, 6 Drawing Figures

PRIOR ART
FIG. 1 A
FIG. 1 B
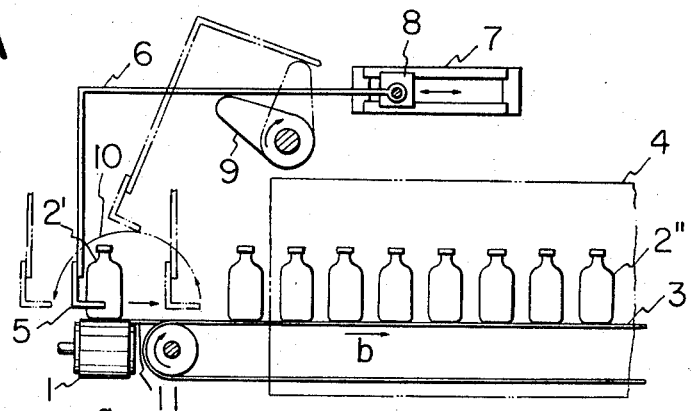
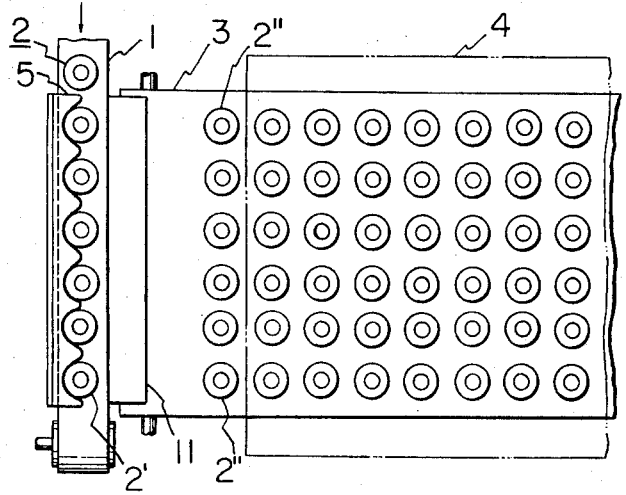

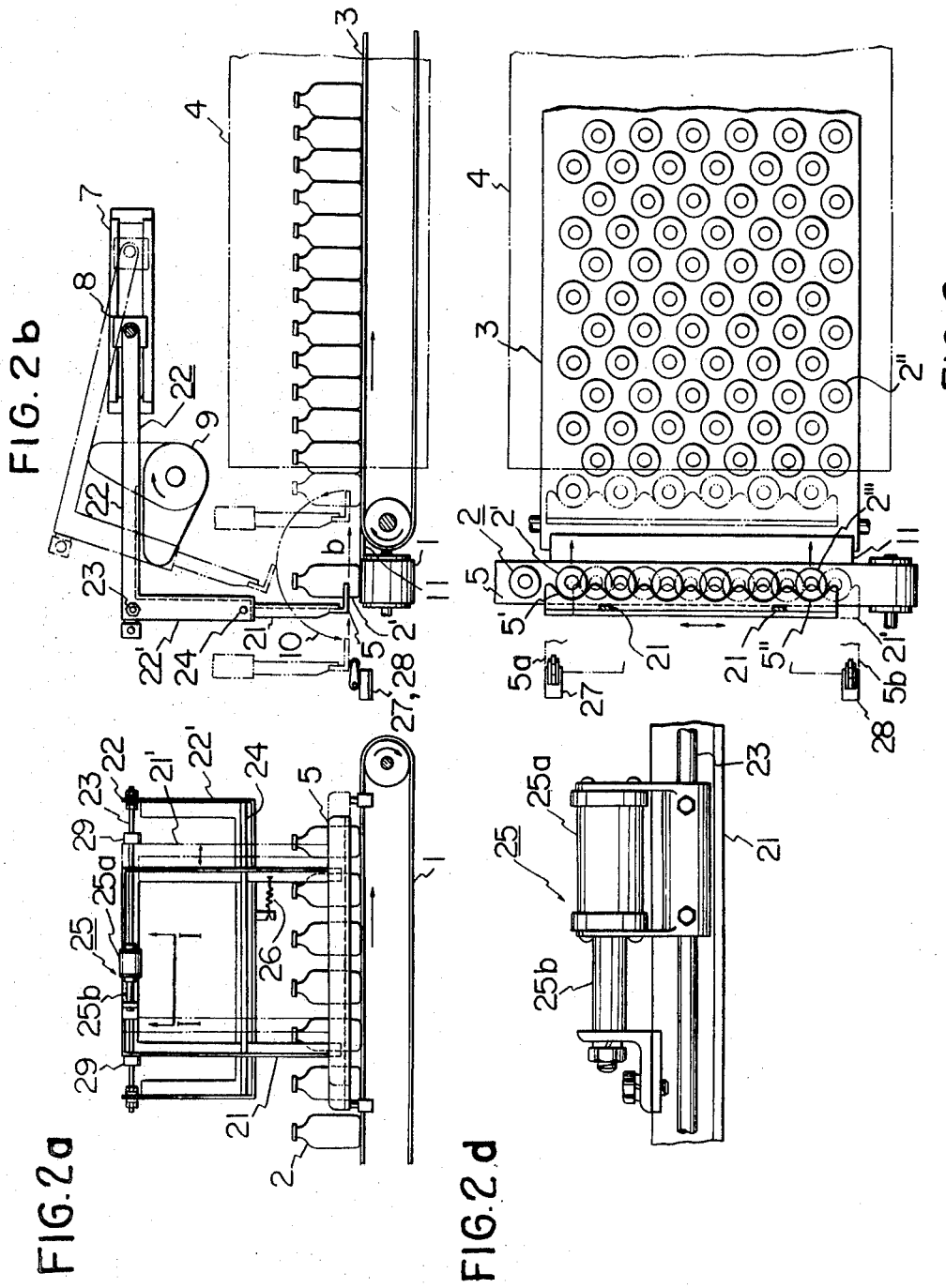

APPARATUS FOR ARRANGING ARTICLES IN STAGGERED ROWS

The present invention relates to an apparatus for changing the arrangement of articles, such as bottles, and more particularly, to an apparatus for converting the arrangement of articles from a straight line condition on a feed conveyor into a zig-zag or staggered arrangement while transferring the articles onto a receiving conveyor in a direction perpendicular to the direction in which the articles are conveyed by the feed conveyor.

In the conventional conveying and arranging devices for bottles, the bottles supplied and disposed on the feed conveyor are merely pushed onto a receiving conveyor so that the supplied bottles are disposed linearly in both the transverse and longitudinal directions with the result that the bottles may easily fall down upon one another.

The present invention proposes to eliminate the aforementioned disadvantages of the conventional devices and provides an apparatus for converting the arrangement of articles, such as bottles, whereby the bottle supply per unit time and per layer is increased and whereby a staggered arrangement is provided to prevent the supplied bottles from falling down upon one another.

According to one aspect of the present invention, there is provided an apparatus for converting the arrangement of articles which are continuously fed by a feed conveyor while transferring the articles onto a receiving conveyor in a direction perpendicular to that of the advancing direction of the feed conveyor. The apparatus comprises a movable arm mounted for reciprocal movement in the direction of movement of the arm and having a feeding plate for pushing the articles from the feeding conveyor onto the receiving conveyor, means for driving the sliding frame to slide it relative to the movement of the movable arm, and sensing and driving means for driving the movable arm so that it cyclically feeds a predetermined number of articles from the feed conveyor onto the receiving conveyor.

Other objects, features and advantages of the present invention will become apparent from the following description when taken in conjunction with the accompanying drawings, in which:

FIG. 1A is a schematic side view of a conventional device for feeding bottles;

FIG. 1B is a schematic plan view of the device shown in FIG. 1A;

FIG. 2a is a schematic front view of one embodiment of the apparatus according to the present invention for disposing the bottles in zig-zag form;

FIG. 2b is a schematic side view of the apparatus in FIG. 2a;

FIG. 2c is a plan view of the apparatus in FIG. 2a; and

FIG. 2d is a side view of a part of the apparatus taken along the line I—I in FIG. 2a.

For a clear understanding of the present invention, a conventional transferring device will first be described with reference to FIGS. 1A and 1B, which show the known type device for transferring bottles from a feed conveyor to a receiving conveyor which conveys the bottles in a succession of spaced-apart rows into a decorating zone for burning an ink coating previously applied on them.

Referring to FIGS. 1A and 1B, a feed conveyor 1 supplies printed bottles 2 to a predetermined position in the direction designated by the arrow a. A receiving conveyor 3 moves in a direction perpendicular to the feeding direction of the feed conveyor 1, designated by the arrow b, and introduces the bottles 2 into a decorating zone 4 to burn the printed ink coated on the bottles 2. A feeding plate 5 is provided for pushing and feeding the bottles 2' fed by the feed conveyor onto the receiving conveyor 3 and the plate is fixed to the end of a feeding arm 6.

A driving device 7 comprises a slider 8 for reciprocally moving the feeding plate 5 in the direction of the movement of the receiving conveyor 3. The slider 8 is reciprocally driven, for example, by a hydraulic cylinder or pinion affixed to one end of it. An eccentric cam 9 is provided for pushing up or raising the feeding arm 6 during its return movement. The cam rotates synchronously with the reciprocal movement of the feeding arm 6 so that the feeding plate 5 may trace the locus 10 shown in the drawing. The locus 10 allows feeding of successive rows of bottles 2' by the feeding plate 5 onto the receiving conveyor 3 during the feed stroke while preventing the feed plate from knocking down the bottles supplied on the feed conveyor 1 during the return stroke. A bridge 11 is provided between the conveyor 1 and 3.

In operation of the conventional feeding device, the bottles 2' supplied on the feed conveyor 1 are merely pushed across the bridge 11 onto the receiving conveyor 3 by means of simple actuation of the feeding plate 5 and the bottles 2'' are arranged linearly in both the transverse and longitudinal directions to be introduced into the decorating zone 4. Accordingly, excessive space exists between the arranged bottles on the receiving conveyor 3 resulting in an undesirable loss of space and the bottles are advanced by the receiving conveyor 3 in an unstable condition whereupon they are capable of falling down upon one another in multiple number.

The apparatus of the present invention contemplates to eliminate the aforementioned disadvantages of the conventional bottle transferring device by disposing the bottles 2'' in a zig-zag or staggered form during feeding of the bottles by the feed conveyor 1 onto the receiving conveyor 3.

The present invention provides an apparatus for converting the arrangement of articles, such as bottles, fed on a feed conveyor while transferring the articles onto a receiving conveyor in a direction perpendicular to the direction in which the articles are fed by the feed conveyor. The apparatus comprises a movable arm reciprocally moving in the direction of movement of the receiving conveyor, a sliding frame slidable in a direction perpendicular to the movement of the arm and having a feeding plate for pushing the articles off the feed conveyor onto the receiving conveyor, means for driving the sliding frame to slide it with respect to the movement of the movable arm, and sensing and driving means for cyclically driving the movable arm so that it cyclically feeds a predetermined number of articles from the feed conveyor onto the receiving conveyor.

Reference is now made to FIGS. 2a–2d which show one embodiment of the apparatus according to the present invention for converting the arrangement of articles, such as bottles, in a zig-zag form. In FIGS. 2a–2d, parts corresponding to similar parts shown in FIGS. 1a and 1b have the same reference character.

A sliding frame 21 is slidably mounted on a front frame portion 22' of a movable feeding arm 22. The sliding frame 21 is mounted on guide shafts 23, 24 connected to the front frame portion 22' for movement in a direction perpendicular to the moving direction of the feeding arm 22. The sliding frame 21 is connected to the feeding plate 5 to control the movement thereof in accordance with the motion imparted to the sliding frame. An electromagnetic device 25 is provided for reciprocally driving the sliding frame 21 and comprises an electromagnet having a cylinder 25a fixed to the guide shaft 23 and a movable armature rod 25b fixed to the sliding frame 21 A tension coil spring 26 is provided between the front frame portion 22' and the sliding frame 21. A pair of limit switches 27 and 28 are positioned in spaced-apart relationship for detecting the position of the feeding plate 5 and accordingly actuate the electromagnet. The limit switches 27, 28 have actuating portions fixed to the lowermost end of the sliding frame 21 and a stopper ring 29 is provided for adjusting the stroke of the sliding frame 21. The limit switches 27, 28 cooperate with suitable circuitry (not shown) to alternately energize and deenergize the electromagnetic device 25 whereupon the sliding frame 21 is reciprocated along the guide shafts 23, 24.

In operation of the apparatus and assuming that the apparatus is initially in the position depicted in solid lines, when the bottles 2' are advanced by means of the feed conveyor 1 along one path of travel to a terminal end portion thereof whereupon the bottles 2' are in the transferable state, such is detected by a limit switch (not shown) fixed to the end of the feeding plate 5 or by means of a suitable counting device. Then the driving device 7 is actuated by the output from the limit switch affixed to the feeding plate so that the movable arm 22 is moved towards the right, as viewed in FIG. 2b, with the result that the feeding plate 5 is pushed in the direction indicated by an arrow b. Thus, one row of bottles 2' are slid across the bridge 11 and are fed to a starting end portion of another path of travel defined by the receiving conveyor 3. This latter position of the apparatus is designated by the dotted line and the bottles transferred onto the receiving conveyor 3 are then introduced into the decorating zone 4 by the receiving conveyor 3. After the row of bottles 2' are fed out, the feeding plate 5 is immediately returned to its original position and during the return movement, the eccentric cam 9 is rotated in timed relationship therewith to effect movement of the feeding plate 5 along the locus 10 so as to raise the movable arm 22 above the level of the next advancing row of bottles.

As the feeding plate 5 returns to its original position, the lower surface 5a of one end thereof actuates the limit switch 27 which sends a control signal through a latching relay (not shown) to the electromagnetic device 25 to energize same to slide the sliding frame 21 to the position 21' against the biasing force of the tension spring 26. The limit switch affixed to the feeding plate 5 then detects when the lead bottle 2''' disposed at the leading end of the next row of bottles 2' opposes the endmost recess 5'' formed in the feeding plate 5, indicating that the next row of bottles is in the transferable state, and provides an output signal to the driving device 7 whereupon another feeding cycle of the feeding plate 5 is carried out. However, upon return movement of the feeding plate 5, the end 5a of the feeding plate 5 does not contact the limit switch 27 due to the displacement of the sliding frame 21 to the position 21' and hence the other end 5b of the feeding plate 5 actuates the limit switch 28 to deenergize the electromagnetic feeding device 25 whereupon the sliding frame 21 is slidingly returned along the guide shaft 23 by the returning force of the coil spring 26 and another feeding cycle is then carried out.

It is preferable that in order to reduce the frictional resistance of the sliding surfaces between the guide shafts 23, 24 and the sliding frame 21, suitable bearings or other means may be provided so that the present apparatus may operate smoothly.

It should be understood from the foregoing description that the present invention provides an apparatus for converting a linear arrangement of articles into a staggered arrangement and which is simple in structure. The apparatus comprises a simple sliding frame and a device for alternately driving the sliding frame to two different positions so as to arrange the bottles on the receiving conveyor in a zig-zag form with the result that the bottles supplied per unit time is increased and, at the same time, the bottles are prevented from falling down upon one another.

What I claim and desire to secure by Letters Patent is:

1. An apparatus for transferring articles from a linear arrangement to a staggered arrangement comprising: first advancing means operative to longitudinally advance in a linear array along one path of travel having a terminal end portion lying in a given plane a plurality of longitudinally spaced-apart articles; second advancing means receptive of the articles advanced by said first advancing means operative to advance same along another path of travel different than said one path of travel and having a starting end portion lying in said given plane; and means disposed along said one path of travel for automatically transferring successive groups of linearly disposed articles from said terminal end portion thereof while maintaining the articles at the level of said given plane to said starting end portion of said another path of travel in successively staggered rows while arranging the transferred articles on said another path of travel in mutually spaced-apart relationship during operation of said first and second advancing means.

2. An apparatus for transferring articles from a linear arrangement to a staggered arrangement comprising: first advancing means for longitudinally advancing in a linear array along a path of travel having a terminal end portion lying in a given plane a plurality of longitudinally spaced-apart articles; second advancing means receptive of the articles advanced by said first advancing means for advancing same along another path of travel different than said first-mentioned path of travel and having a starting end portion on which the articles are received lying in said given plane; and means disposed along said first-mentioned path of travel for automatically transferring successive groups of linearly disposed articles from said terminal end portion of said first-mentioned path of travel while maintaining the articles at the level of said given plane to said starting end portion of said another path of travel in successively staggered rows comprising a movably mounted article feeding member disposed along said first-mentioned path of travel, means mounting said article feeding member for cyclical movement along said another path of travel to effect transfer from said first advancing means of successive groups of linearly disposed articles in unit rows to said second advancing means, means mounting said article feeding member for reciprocal movement along said first-mentioned path of travel to effectively stagger the unit rows of articles during their transfer to said second advancing means, and drive means for cyclically driving said article feeding member along said another path of travel in synchronization with reciprocating same along said first-mentioned path of travel to transfer the linearly disposed articles from said first advancing means to said second advancing means in successively staggered rows.

3. An apparatus according to claim 2; wherein said means mounting said article feeding member for reciprocal movement comprises a slidable frame member, means connecting said article feeding member to said frame member, a guide bar disposed parallel to said first-mentioned path of travel, and means mounting said frame member for sliding movement along said guide bar.

4. An apparatus according to claim 3; wherein said drive means includes electromagnetic means operative when energized to slide said frame member in one direction along said guide bar, spring means biasing said frame member in a direction opposite to said one direction for effecting sliding of said frame member in the opposite direction along said guide bar when said electromagnetic means is deenergized, and means for alternately energizing and deenergizing said electromagnetic means in synchronization with the cyclical driving of said article feeding member along said another path of travel.

5. An apparatus according to claim 2; wherein said means mounting said article feeding member for cyclical movement comprises a movable arm connected to said article feeding member; and wherein said drive means includes actuating means for cyclically reciprocating said arm along said another path of travel through a feed stroke wherein one unit row of articles is transferred from said first advancing means to said second advancing means and through a return stroke, and cam means coacting with said arm during each return stroke to raise said article feeding member above the articles being transferred by said first advancing means.

6. An apparatus according to claim 5; wherein said actuating means comprises a hydraulic actuator pivotally connected to said arm.

7. An apparatus according to claim 5; wherein said means mounting said article feeding member for reciprocal movement comprises a guide bar connected to said movable arm and parallel to said first-mentioned path of travel, a slidable frame member connected to said article feeding member, and means mounting said frame member for sliding movement along said guide bar.

* * * * *